(12) United States Patent
Jones et al.

(10) Patent No.: US 7,228,504 B2
(45) Date of Patent: Jun. 5, 2007

(54) APPARATUS AND METHOD ENABLING CONFIGURABLE GRAPHICAL DISPLAY OF TABLE-BASED DATA IN A WEB-BASED APPLICATION

(75) Inventors: Walter R. Jones, Somerset, NJ (US); Sudha Piddaparti, Hazlet, NJ (US); Lucia C. Sekino, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 795 days.

(21) Appl. No.: 10/449,916

(22) Filed: May 30, 2003

(65) Prior Publication Data
US 2004/0243929 A1 Dec. 2, 2004

(51) Int. Cl.
*G06F 3/00* (2006.01)
(52) U.S. Cl. .................. 715/749; 715/760; 715/765; 715/513; 715/504; 715/509; 715/522
(58) Field of Classification Search ........... 715/749, 715/760, 738, 744, 765, 866, 733, 748, 513, 715/503, 504, 509, 517, 522, 524, 904
See application file for complete search history.

(56) References Cited

U.S. PATENT DOCUMENTS

| | | | |
|---|---|---|---|
| 6,718,515 B1 * | 4/2004 | Conner et al. | 715/509 |
| 6,779,152 B1 * | 8/2004 | Conner et al. | 715/509 |
| 6,851,088 B1 * | 2/2005 | Conner et al. | 715/509 |
| 6,922,200 B1 * | 7/2005 | Marques | 715/788 X |
| 7,089,492 B2 * | 8/2006 | Anderson | 715/513 X |
| 2002/0188635 A1 * | 12/2002 | Su | 715/513 |
| 2004/0133852 A1 * | 7/2004 | Kolb et al. | 715/513 |

OTHER PUBLICATIONS

XML-Based Templates for Generating Artifacts from Java-Based Models, IBM Research Disclosure, UK, vol. 41 No. 416, Dec. 1, 1998.*

* cited by examiner

*Primary Examiner*—Raymond J. Bayerl

(57) ABSTRACT

Method for displaying user-configurable data in a table in a web browser application includes obtaining a copy of a table template, creating a file that defines table properties, performing a customization subroutine. The customization subroutine includes the steps of instructing a DHTML table component to pass one or more entries of the table properties file, setting one or more customizable table properties, recognizing a browser application and drawing a browser application page with a customized table.

14 Claims, 7 Drawing Sheets

APPARATUS AND METHOD ENABLING CONFIGURABLE GRAPHICAL DISPLAY OF TABLE-BASED DATA IN A WEB-BASED APPLICATION

BACKGROUND OF THE INVENTION

1. Technical Field of the Invention

This invention relates to a computer program utilizing a graphical user interface and, more particularly, to a method for graphically displaying table-based data in a web-based (i.e., Internet browser) application.

2. Background Art

Many computer programs use a graphical user interface (GUI) to administer the features that are included therein. This is especially true in Internet web browsing applications. In many instances, it is necessary to display various types of data in tabular form in such a browser application. Currently, tabular data, is displayed by using a Java® Applet table. The Java® language and environment comprises a set of technologies provided by Sun Microsystems of Mountain View, Calif.

Using a Java® Applet table is advantageous because such a table has all the functionality desired in a typical web browser application including the following: scrolling browsers, column resizing, column dragging, column hiding, print preview and printing of table data, saving of table data, single selection, multiple selection, user table references, detail view of row data, alternate view for table data, and support of multiple types of data columns such as Boolean, text fields, numeric fields, dropdown lists, icons and hyperlinks. However, the disadvantage of using a Java® Applet table is in the performance aspect of such a display format. Specifically, the Java® Applet download time is considerable (from a users perspective) when the application is loaded for the first time. Additionally, in web based terminology, a "thin" client is preferred over a "thick" client due to performance reasons with respect to CPU processing speed. Java® Applets are considered "thick" clients which undesirably reduce CPU processing speeds. Java® Applet tables also have a number of security constraints which are not flexible to customization and which need specific licenses. A Java® Applet also requires a Java® plugin (a software module) be installed on a users machine to run the Applet. All of these factors add complexity to the overall process of displaying tabular information in a web-based application.

SUMMARY OF THE INVENTION

The disadvantages heretofore associated with the prior art are overcome by the present invention of a method for displaying user-configurable data in a table in a web browser application. The method includes the steps of obtaining a copy of a table template, creating a file that defines table properties, performing a customization subroutine. The customization subroutine includes the steps of instructing a DHTML table component to pass one or more entries of the table properties file, setting one or more customizable table properties, recognizing a browser application and drawing a browser application page with a customized table.

Creating a table properties file includes selecting a number of columns, type of column and size of column for the customized table. Additionally, a column titles file is created after creating the table properties file. Subsequently, dropdown labels and names are added to the column titles file. The table properties entries that are passed are selected from the group consisting of table property file entries, an XML metamodel name, an XML element name and a default communication flag. A style sheets file is also read after recognizing the browser application.

In another embodiment of the invention, there is a method for making a user-configurable table generating component for a web-based application including the steps of creating a Java® file to read a table properties file, generating and storing DHTML to the web-based application based on the Java® file, generating initial XML and performing a self-customization routine that applies attributes to table columns based on the XML and stores same as objects in the web-based application. The self-customization routine further comprises reading the XML, parsing the XML and assigning attributes to variables to customize the table columns. Subsequently, pointers are generated and stored for the customized table columns. Table data is then read in and parsed and table rows are generated based on the customized table columns. The rows are then stored as objects in a component data array.

BRIEF DESCRIPTION OF THE DRAWINGS

The teachings of the present invention can be readily understood by considering the following detailed description in conjunction with the accompanying drawing, in which.

To facilitate understanding, identical reference numerals have been used, where possible, to designate identical elements that are common to the figures.

DETAILED DESCRIPTION

The invention will be primarily described within the context of a graphical user interface (GUI) used to administer features included within a program known as the "NAVIS Optical Management" that is manufactured by Lucent Technologies Incorporated of Murray Hill, N.J. However, it will be readily appreciated by those skilled in the art that the teachings of the present application may be advantageously adapted to any program where it is desirable to add new features and/or administrative functions to the program in a substantially seamless manner.

Additionally, the present invention will be primarily described within the context of the Java® environment, which comprises a set of technologies provided by Sun Microsystems of Mountain View, Calif. for creating and safely running software programs in both stand alone and network environments. However, it will be appreciated by those skilled in the art that other environments may also be employed in implementing the teachings of the present invention. For example, the ActiveX environment promoted by Microsoft Corporation of Redmond, Washington may also be used. Other environments are also known to those skilled in the art.

Figure 1A:
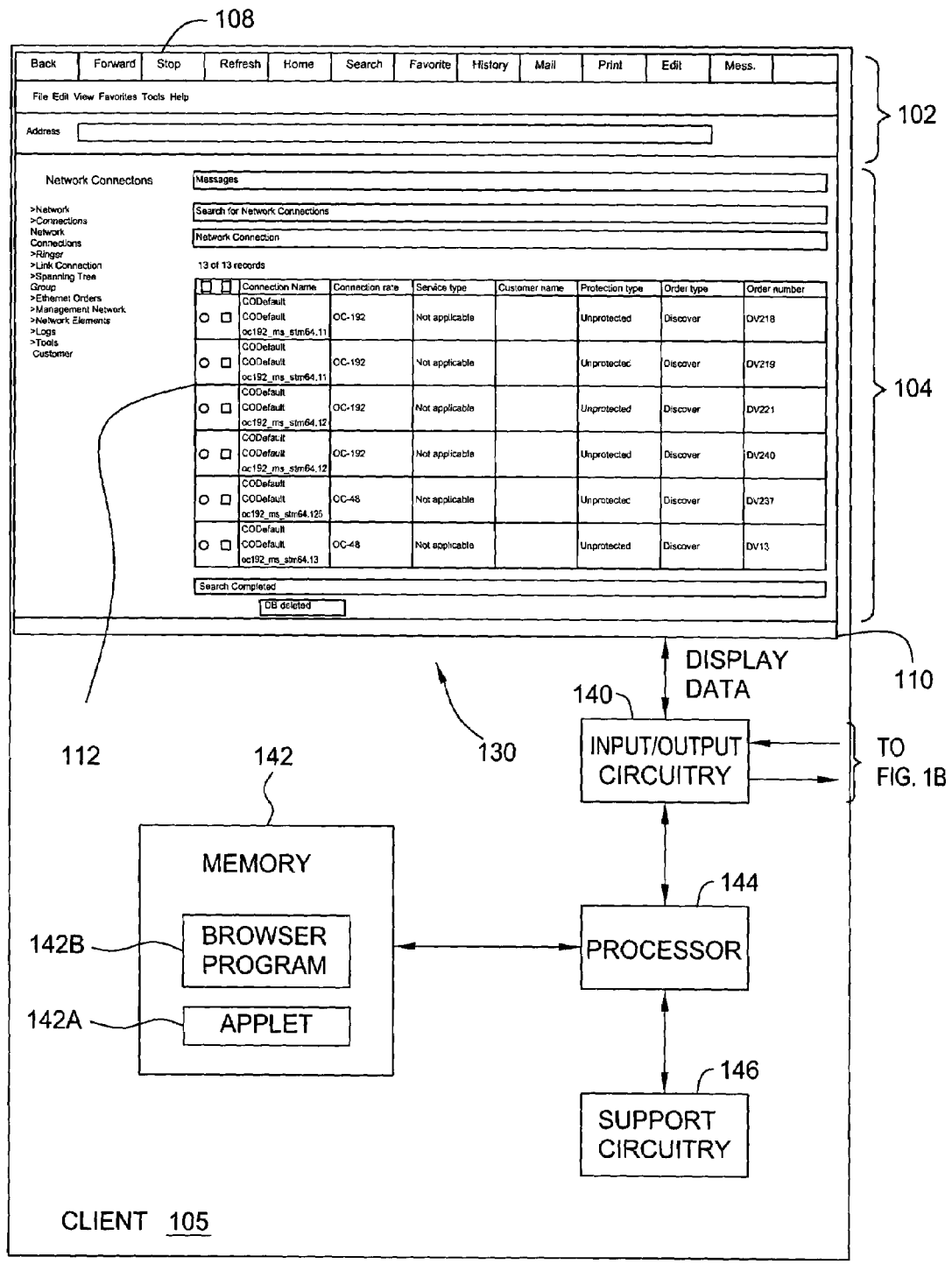
FIG. 1A depicts a high level block diagram of a client side of a system utilizing the teachings of the present invention.
Figure 1B:
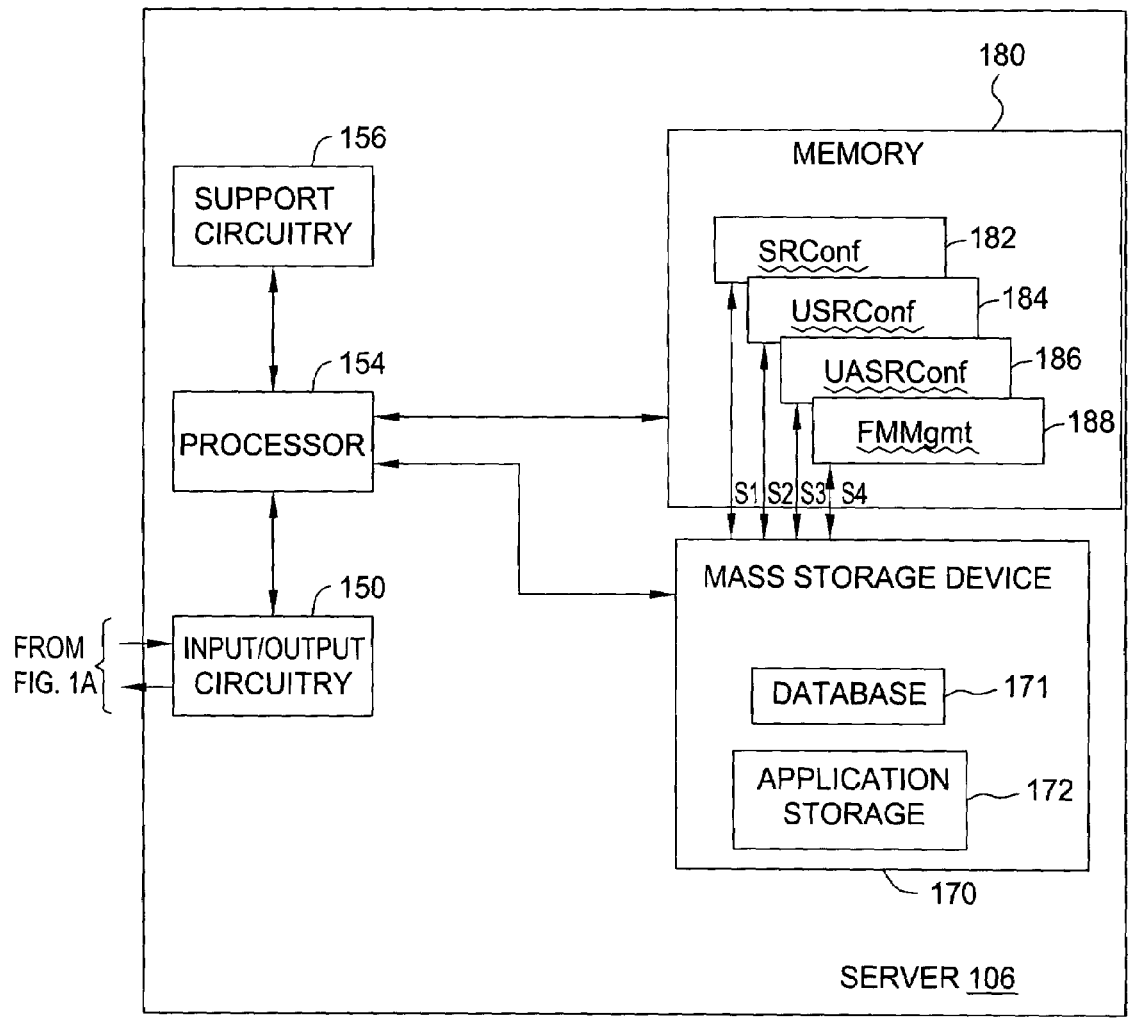
FIG. 1B depicts a high level block diagram of a server side of a system utilizing the teachings of the present invention.

FIG. 1A depicts a high level block diagram of a client side of a system utilizing the teachings of the present invention while FIG. 1B depicts a high level block diagram of a server side of a system utilizing the teachings of the present invention (collectively referred to as FIG. 1). Specifically, FIG. 1 depicts a high level block diagram of a system 100 in which a client 105 interacts with a server 106 within the context of a client-server applications program. The client 105 is depicted as a general purpose computing device including a processor 144 as well as memory 142 for storing a browser program 142B and at least one Applet 142A. The processor 144 cooperates with conventional support circuitry 146 such as power supplies, clock circuits, cache memory and the like as well as circuits that assist in executing various software methods. The client 105 also comprises input/output circuitry (I/O) 140 that forms an interface between the processor 144 and the server 106, and between the processor 144 and a client display device 108. The client display device 108 may comprise a computer monitor or other display device commonly known to those skilled in the art.

The client 105 communicates with the server 106 via a communications network (not shown). Communications between the client and server are achieved using, illustratively, the protocol known as the Transmission Control Protocol and Internet Protocol (TCP/IP). Other transmission protocols may be used. Information shared between the client 105 and the server 106 may be in the form of Hyper Text Markup Language (HTML) pages. The HTML pages are associated with particular logical addresses and are communicated between the client 105 and server 106 entities using the so-called Hyper Text Transport Protocol (HTTP) or the Secure Hyper Text Transport Protocol (HTTPS). An exemplary client side browser program 142B comprises the Netscape® Navigator browser manufactured by Netscape Communications Corporation of Mountainview, Calif. or the Internet Explorer browser manufactured by Microsoft Corporation of Redmond, Wash.

Exemplary graphical user interface (GUI) imagery is depicted on the display device 108 of FIG. 1. Specifically, the exemplary imagery comprises a display window that is divided into a plurality of screen areas; namely, a control area 102, a detail or configuration view area 104, and a feedback message area 110. The control area 102 of the client display 108 comprises a plurality of objects represented by icons. The objects are depicted using basic browser icons for tasks such as FWD, BACK, STOP, REFRESH, and the like; plain text with drop-down menus for other functions such as file opening, savings, help, and the like; and an open field area to enter text (i.e., a specific URL). The detail area 104 comprises an open area that is customized as per the specific instructions and code of the browser program and can include text, tables and various other data as requested by the client 105. The feedback message area 110 provides information regarding the status of the displayed information or previous request from the client 105.

The server 106 is depicted as a general purpose computing device including a processor 154 that cooperates with conventional support circuitry 156 such as power supplies, clock circuits, cache memory and the like as well as circuits that assist in executing the various software methods. The processor 154 also cooperates with input/output (I/O) circuitry 150 that forms an interface between the processor 154 and the client 105.

The processor 154 cooperates with a mass storage device 170 that includes at least a data base 171 and application storage portion 172. The data base 171 is used to store configuration data and other data that is processed by the application. The application storage portion 172 is used to store the files necessary to implement the software application, such as object date, Servlets and the like.

As previously noted, each icon within the client display device 108 represents an object. These objects may be associated with data stored in the server 106 and, in response to user selection of an icon, the respective object is retrieved, loaded and executed by the client 105. To accomplish this, a message identifying the selected object is sent from the client 105 to the server 106. The server 106, in response to the selection indicative message, retrieves the data associated with the selected object from the mass storage device 170 and transmits the retrieved data to the client 105, where it is stored in the Applet storage portion 142A of the memory 142. The browser 142B then executes the Applet according to the retrieval data.

The server processor 154 retrieves, as necessary, the Servlets from the mass storage device 170. Various Servlets are used to implement the software application. The retrieved Servlets are run in the memory 180 as indicated to illustrate the present invention. The four Servlets depicted are shown as interacting with the mass storage device 170 directly via signal paths S1–S4. However, it will be appreciated by those skilled in the art that information transfer between the mass storage device 170 and the memory 180 is routed via the processor 154 and, typically, not directly as shown.

Figure 4:
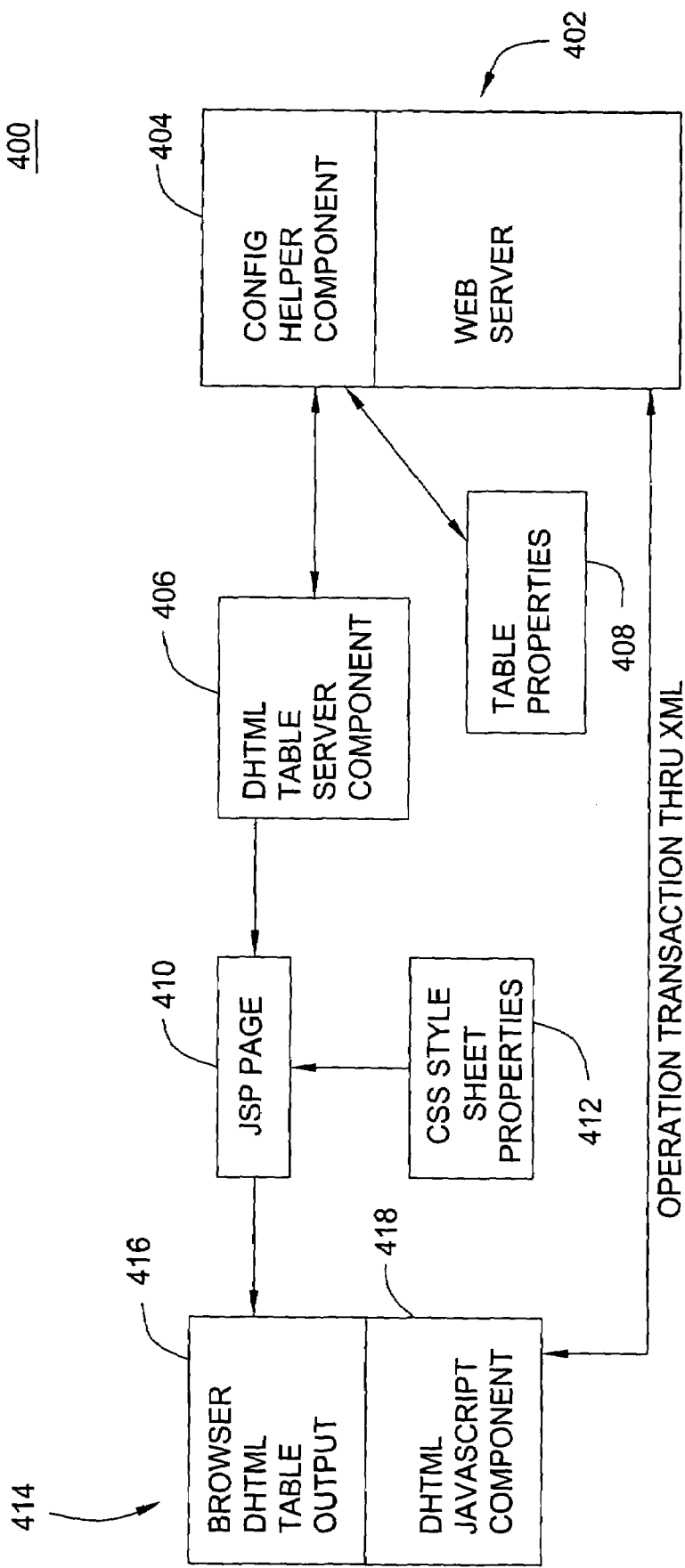
FIG. 4 depicts a flow diagram of the subject invention.

FIG. 4 depicts a flow diagram of the subject invention. Specifically, since the invention is a combination of hardware and software components interacting with each other, FIG. 4 represents various aspects of the invention regardless of their specific physical form and relates to them as to the tasks that they perform. The flow diagram of FIG. 4 depicts an overall system 400 for displaying data in a table format in a page of a web browser application in a highly dynamic and customizable format. The system 400 includes a web server 402 (which in one embodiment of the invention may be server 106 as described above). The web server 402 interacts with additional components of the system 400 to provide data in the appropriate table and page format from one or more remote sources found, for example, on the Internet. Within the web server 402 is a configuration helper component 404. The configuration helper component 404 interacts with other system components to assist in the configuration of the specific table that is to be created and displayed in a user's web browser (e.g., client display device 108) along with the appropriate data inserted into the table. The configuration helper component 404 is connected in parallel to a DHTML table server component 406 and one or more files 408 representative of the specific table properties that are to be displayed in the user's browser. The DHTML table server component 406 is connected to a JSP page component 410. The DHTML table server component 406 generates and carries the HTML that will be used to eventually display the table and data in the display device 108. The generated HTML is loaded into the JSP page component 410. The JSP page component 410 sits on the web server 402 and obtains HTML from the DHTML table server to draw the table. The JSP page component 410 also receives input from a CSS style sheet properties file 412. The JSP page component 410 is connected to a user output display device 414 (and in one example can be display device 108 of FIG. 1). The display device 414 contains two subcomponents for displaying the dynamic table data. Specifically, a browser DHTML table output component 416 provides the specific customized table with the appropriate data inserted into the table cells, and a DHTML Java® Script component 418 provides the necessary language and execution code for drawing a table on the page in the desired format.

Figure 2:
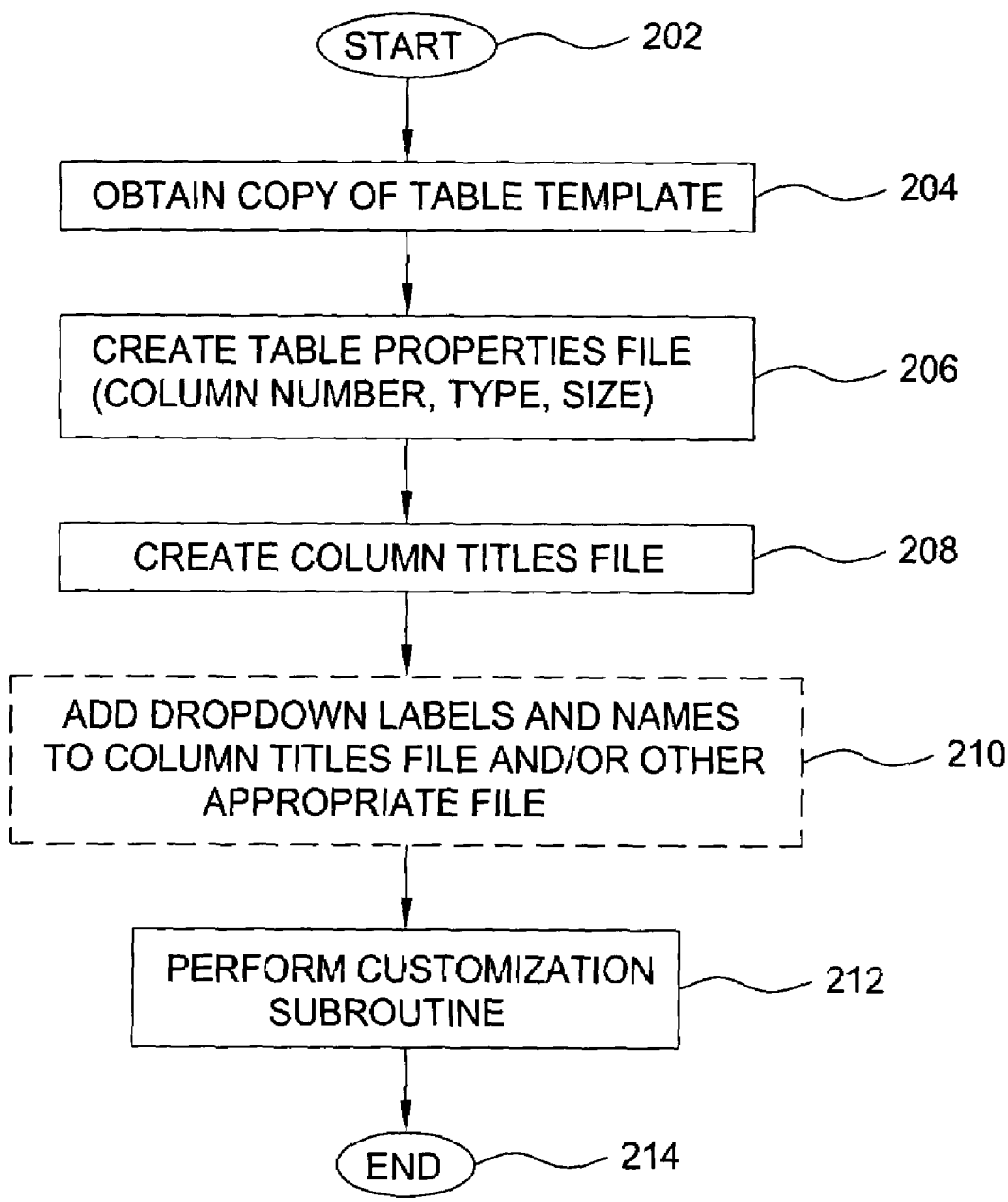
FIG. 2 depicts a series of method steps for using the component of the subject invention.

A method of using the inventive table component is seen in FIG. 2 as a series of method steps 200. Specifically, the method starts at step 202 and proceeds to step 204 where a copy of a template file for the table to be created is obtained. The table template file may be found in a plurality of locations such as the client 105, the server 106, or embedded in one or more of the various subcomponents seen in FIG. 400.

At step 206, a table properties file is created. Specifically, the creator of the table is charged with the responsibility of defining the number of columns required for the table and other defining features such as column type and column size. For example, the table properties file creator defines all of the columns in the properties file in the order in which the columns have to appear on the display device (such as client display device 108). This order can later be changed by the client 105 by setting preferences through a table preferences options submenu. At step 208, a column titles file is created by the table creator to define the column titles for each of the columns created in the properties file.

Step 210 is an optional step which depends upon whether dropdown type columns have been created previously in step 206. That, is, if the table creator has defined a dropdown type column in the properties file, step 210 allows the creator to define dropdown labels and names in additional files. For example, such dropdown labels and names may be added to a file called Combo.Properties and/or Label.Properties. Should there be no dropdown type columns in the table being created, step 210 is skipped and the method 200 proceeds directly to step 212. In step 212, a customization subroutine is performed to prepare the table template for future display. The details of the customization subroutine 212 are described in greater detail below. Once the customization subroutine 212 is performed, the table is in condition to be viewed by the user. The table associated with the subject invention is a Java® Script table that is generated by a Java® Server Bean or component called HTML Simple-Table.Java. The inventive component is a mix of Java®, Java® Script and HTML. The method ends at step 214.

The details of obtaining a copy of the table template presented in step 204 are as follows.

Starting in a header section of the JSP page component, a table creator will first create an Instance Page of the DHTML table by using the following command:

DHTMLTable userTable=new DHTMLTable(key, configHelper instance,"username")

Next, the table creator can find the JSTableTemplate.jsp file available in a version control software (such as VSS or, in one particular embodiment of the invention, sablime). Specifically, in the header section of the JSP page component, one can change the "javascripttemplate.js" to "yourpage.js" with the specific scripting code as follows:

<script language="JavaScript1.2"
src="/osm/javascript/core/yourpage.js"></script>

Once the table creator has obtained the copy of the javascripttemplate file and changed it to desired name, a data arrived event function can be modified and the following lines of code added:

```
Ex: If your table key is "Users", then the code will be as follows:
    If (getComponentName =="UsersTable")
    {
        //assume array of records
        for(var cnt=0;cnt<returnRecs.length;cnt++)
        {
        Users.updateRecord(return Recs[cnt],false,cnt)
        }
```

The updateRecord method takes 3 parameters: an array of values for a row, a Boolean value to indicate if it's an update or an insert and an index for the row to be inserted. If the Boolean value is false, the row is inserted; otherwise, the row is updated. The index is the index where the row should be inserted in case the row has to be inserted at a specific place. In case the user wants to add all records the first time, the index should just be the counter for the loop. The array of values only has the data values (i.e., does not contain data for the Select and Detail column). Additionally, there is a column in the table which is the row id and is hidden.

The details of creating the table property files described above in step 206 is provided to facilitate an understanding of how to properly build these files so as to give the table columns the appropriate features and definitions. All columns are to be provided with a predefined width. This differs slightly from an Applet table in that the DHTML table columns are given in pixel values whereas the Applet table column widths are optional and, when provided, are in character widths. The following description provides for the specific encoding necessary to set up table properties for eight different features as follows:

1) To Specify the Universal Resource Locator (URL) of a Column—The link can be specified in the table.properties file by entering following instructions:
   Users.3=key=UserName;size=6;type=Hyperlink; editable=true;link=url;
   In case this link has to be cell based, the link should not be specified in the property file, as the link will be available in the PrimitiveAttrUpdate.

2) For a Table with Hyperlinks—Non-hyperlink cell values are not sent along with the hyperlink information unless specified in the table.Properties file. Therefore, the specific instructions must be provided in the table.Properties file to allow all information in the table to be read in properly. Therefore, for non-hyperlink columns, the following instruction is be provided.
   Users.3=key=UserName;size=6;type=Hyperlink; editable=true;inLink=true;
   Additionally, for hyperlink columns the following instruction is provided:
   Users.3=key=UserName;size=6;type=Hyperlink; editable=true;link=url; inLink=true;
   This specific information must be provided for tables with hyperlinks as the default value of "inLink" is false.

3) For Hidden Columns—To hide (or otherwise not display) certain columns, the following instruction is provided:
   Users.0=key=singleSelect;size=3;type=Radio; visible=false;alwaysHidden=true;

The default value for "alwaysHidden" is false; therefore, the instruction must be provided to hide the column.

4) Column Invisibility—By default, all columns in the table are visible. To change this parameter, the following instruction is provided:
Users.0=key=singleSelect;size=3;type=Radio; visible=false;

Note that there is a slight difference between column height features and column invisibility features. Specifically, when the invisibility feature is combined with the always hidden feature, then by default the column will be visible and cannot be changed by a user accessing the preferences screen. Oppositely, when the invisibility feature is not combined with the column hiding feature, then by default the column will be invisible but the user can change this column by accessing the preferences screen.

5) Icons—The icon name in the subject invention is part of the data response for each cell. As such, the notation to specify the link or icon name in the data response is called using the following nomenclature:
Ex:data+url for hyperlink, and Data+iconname for IconData.

It should be noted that the symbol "|" is a reserved character in XML and cannot be used in Internet Explorer. Accordingly, it is now replaced with a "+" as seen above.

6) Column Select Feature—If the user needs a table without a column select feature, this feature is not specified in the table.Properties file. In such a circumstance, there will be no Select All/Deselect All icon in the toolbar and the user will not be permitted to perform any row operation.

7) Single Select Feature—If the user needs to have a single select table, a radio column is required. Such a radio column can be set in the table.Properties file by using the following command:
Users.0=key=singleSelect;size=3;type=Radio; editable=true;

It should be noted that there may either be a select column or a radio column but not both.

8) Column Detail Feature—If the user needs a table without a column detail, this feature is also not specified in the table.Properties file (similar to the select column feature).

Figure 3:
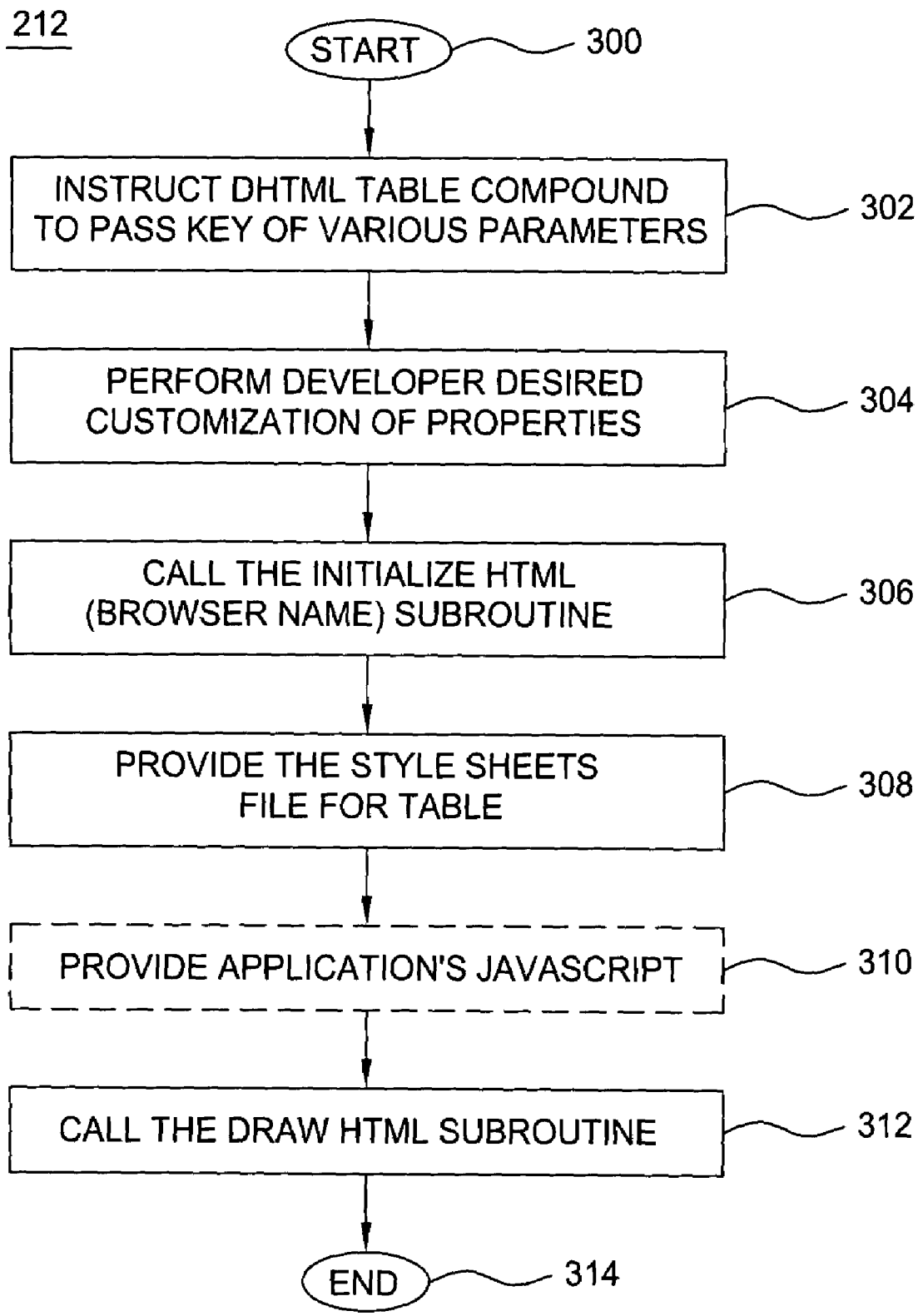
FIG. 3 depicts a series of method steps detailing a customization subroutine of the method described in FIG. 2.

As presented above, customization subroutine 212 is the final step in preparation for the table template to become the desired end product table displayed in a web browser having all the desired properties and functionality not previously realized. FIG. 3 depicts a detailed series of method steps that describe the customization subroutine 212. The customization subroutine 212 starts at step 300 and proceeds to step 302 where a DHTML table component is instructed to pass the key of various parameters in the table component to prepare it for data loading of the table. For example, the various parameters that are instructed to be passed are the Table.Properties file entries, an XML metamodel name, an XML element name, and a default communication flag. The default communication flag indicates to the table that it needs to send a request for the data to be loaded into the table. At step 304, table creator customization of various table properties are performed. For example, the table creator can set properties of the table to be customized such as adding new tool bar icons, or removing the tool bar and the status bars in the instance where the table is used by calling specific methods on the table.

At step 306, an initialize HTML (browser name) subroutine is called in the JSP page component 410 of the system 400. This subroutine recognizes the appropriate browser to which the table data will be displayed and takes the necessary steps to recognize the appropriate HTML code to display the table in the identified browser application. At step 308, an additional file is included for reading in when creating the table. Specifically, the Style Sheets properties file is provided. Typically, this file is already included in the table template file with default settings. However, if the table creator needs to change any of the default settings in the Style Sheets file (for the purposes of adjusting features such as font, color, and the like of printed text in the displayed browser page), he can do so by adjusting parameters in this file.

Step 310 is an optional step that provides the application's Java® Script file, if there is such a file. For example, if a Java® Script file is detected in a Netscape® browser application, it is included at this point in the customization subroutine. If there is no Java® Script file to be included, step 310 is skipped and the customization subroutine proceeds directly to step 312. Step 312 calls a draw HTML subroutine which draws the required HTML once the page loads on the client display device 108. The method ends at step 314.

Figure 5:
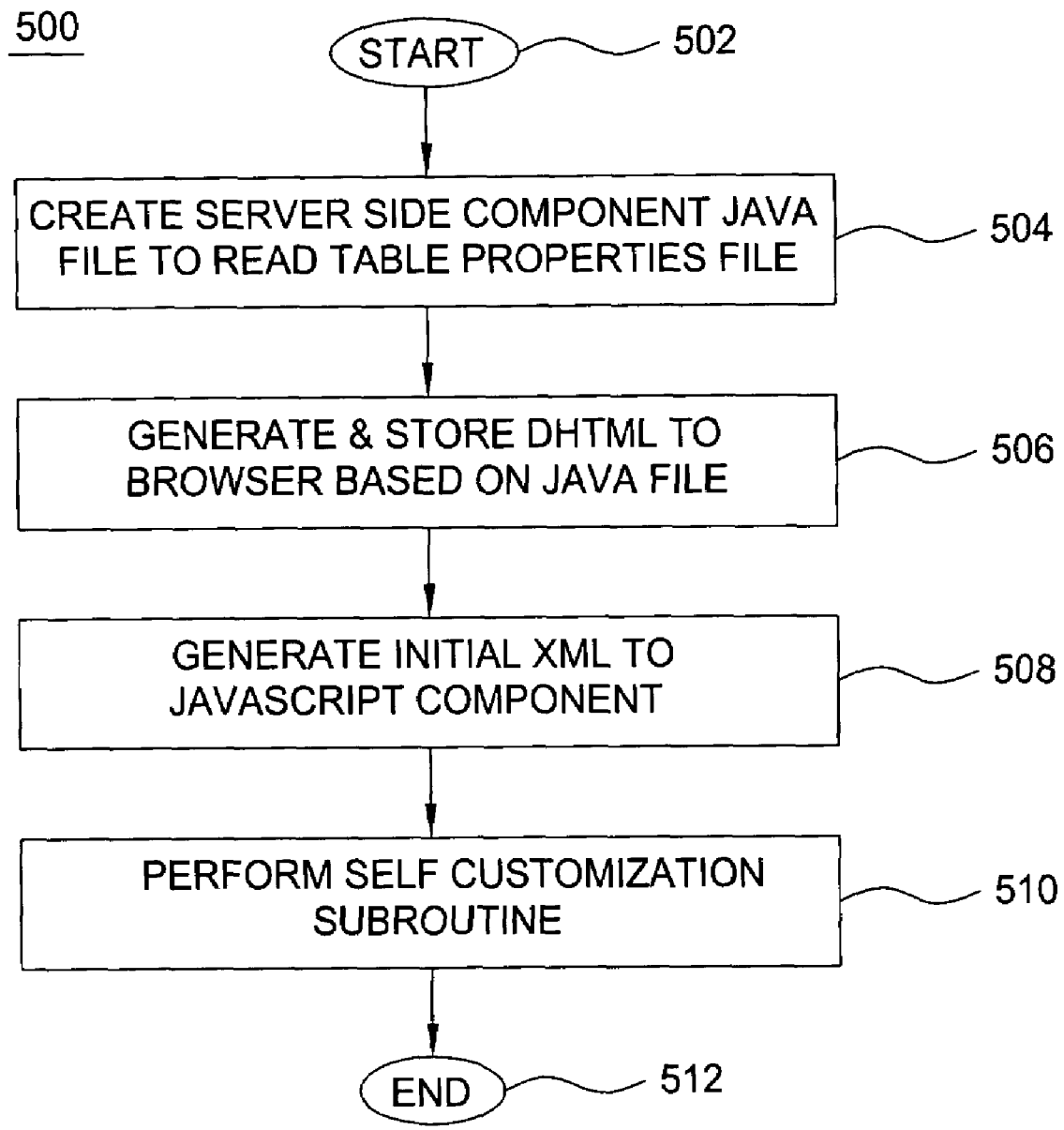
FIG. 5 depicts a series of method steps for designing the component of the subject invention.

FIGS. 2 and 3 and corresponding methods 200 and 212 described in detail the steps necessary to use the component in its environment. Additionally, it is advantageous to know how to design such a component for incorporation of such a component into future applications. Accordingly, FIG. 5 depicts a flow chart of a series of method steps 500 for designing the component of the subject invention. Specifically, the method starts at step 502 and proceeds to step 504 where a server side component Java® file is created to read a Tables Properties file (in one example the file Table.Properties). At step 506, the server side component Java® file is used to generate and store DHTML to the specific browser that will be implementing the component. That is, since different browsers use different variations of DHTML to display the same object, it is necessary to generate and store the appropriate DHTML code for a specific browser in order to generate the correct table properties to be displayed later. At step 508, an initial XML is generated to the Java® Script component 418 in system 400. This initial XML is used to convey all of the information regarding the properties and attributes of the columns from the appropriate properties files to the DHTML table component 416. At step 510, a self-customization subroutine is invoked in order to generate the appropriate DHTML for the specific browser that is being used. This self-customization routine is described in greater detail below. The method 500 ends at step 512 resulting in a device that is capable of executing method 200 to draw the appropriate table in a web browser page and import the appropriate data in a customized set of rows as described.

Figure 6:
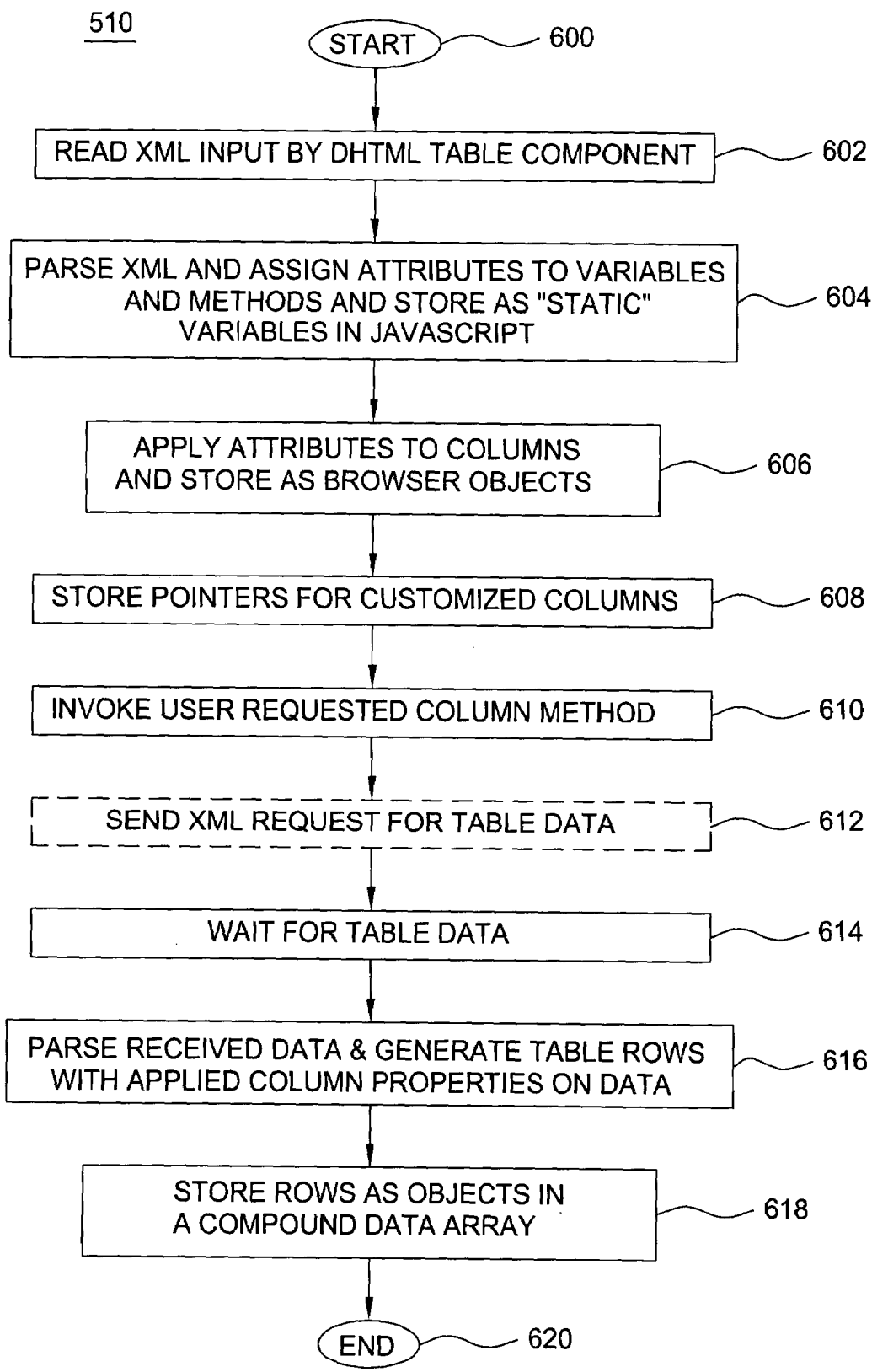
FIG. 6 depicts a series of method steps detailing a self-customization routine of the method of FIG. 5.

Self-customization subroutine 510 is described in greater detail as a series of method steps seen in FIG. 6. Specifically, the self-customization routine 510 starts at step 600 and proceeds to step 602 where a read function of the XML input via the DHTML table component is performed (this is the XML that was generated in step 508). At step 604, the XML is parsed and attributes are assigned to the XML variables and methods. Subsequently, these values are stored as "static" variables in Java® Script. It will be understood to one skilled in the art that, principally, there are no truly static variables in Java® Script, and the use of the word "static" in this particular instance means that the code is sectionalized in such a way that the attributes which are initialized after parsing the XML are never modified but used only for read only purposes.

At step 606, attributes are applied to the columns of the table to be displayed and are subsequently stored as browser objects. In this way, each column has its custom-tailored features which are available for subsequent user desired manipulation or alteration once displayed in the browser. At step 608, pointers are stored for each of the above presented customized columns. At step 610, the browser user invokes a request to tailor one or more columns to his or her desired preference. For example, should the user wish to display the columns in a different order, they can be reordered in the table or the columns may be resized or arranged in a top-down rather than bottom-up display configuration. Other types of user requests can also be satisfied as previously described. Step 612 is an optional step wherein an XML request is sent for the table data dependent upon the default status of the page the browser application is loading. That is, when navigating from point A to point B in a web browser application, there may be times when the application "knows" or recognizes point B and any relevant data that needs to be displayed in a corresponding table (thus a default condition). If the application does not "know" or recognize point B, the XML request is made by requesting search criteria from the user. This search criteria is then evaluated to recall the appropriate records or data to populate a table in the previously unrecognized location. Should the optional step 612 not be necessary (in the default condition), the self-customization subroutine 510 continues directly to step 614 where the routine awaits table data.

At step 616, the received data that was awaited upon in step 614 is parsed and table rows with the desired column properties are generated. The data is subsequently incorporated into the columns according to its appropriate classification. At step 618, the populated table rows are stored as objects in a component data array. In this way, a user can easily perform different operations on the table by performing a specific customizable operation on a specific row. The self-customization subroutine ends at step 620.

The flexibility in design configurations for the table component of the subject invention allows for a high degree of tailoring or updating information within the table. Such functions are accomplished through calling various methods in the header section of the JSP page component 410 of system 400. For example, the following items numbered 1–14 show the specific Java® Script code that must be accessed to change or tailor the desired features as follows:

1) To specify the URL for a new icon in the tool bar, call the setParameter method in the header section of the JSP page:
   userTable.setParameter("New",url);
2) To have a table without the status bar and the tool bar (by default, these bars are provided) call the setParameter method in the header section of the JSP page:
   userTable.setParameter("Instance","true");
3) To do a filter operation on the data displayed on the screen, call the method,
   Tablekey.filterData(new String(filterString), new String (""));
4) To get a list of Column Names, call the method,
   Tablekey.getColumnNames( )
   which returns an array of column names. This will not contain the column Names of Select or Detail column.
5) To get the list of Column Positions, call the method, Tablekey.getColumnPositons( )
   which returns an array of column Positions. This will not contain the column position of the Select and Detail columns.
6) To get the number of rows checked, call the method, Tablekey.getCheckedRows( ).
   This will return a JavaScript array containing the row numbers.
   Note: For a table which has Radio column instead of Select Column, an array of one record will be returned. This array will have the row number of the row selected.
7) To get data for checked rows, call the method, Tablekey.getCheckedRowsData( ).
   This will return a string in which each Row will be separated by "&" and each cell value will be separated by "|".
   Ex: row1cell1|cell2|cell3&row2cell1|cell2|cell3
   Note: For a table which has a radio column instead of select, only one row data will be returned which ever was selected.
8) To get a cell value at a particular cell, call the method, Tablekey.getTableCellValueAt(rowno,colname).
9) To insert/update a record, call the method, Tablekey.updateRecord(recordof cellvalues,false,index to be inserted).
10) To delete a record, call the method, Tablekey.updateRecord(index).
11) To specify the table as Dynamic, call the method, userTable.setUpdateType("dynamic");
12) To Specify Alternate View for a table as a jump to another page, call the method, userTable.setLinkAltView(url);
    The URL has to be the complete URL of the JSP page. The Alternate view can be a jump, or graphs.
13) To add new tool bar icons in the table tool bar, specify the image name, path of the image, function to be called on click of the icon, and the Alt value for the tool bar icon. The table has the root image path which is upto "/OSM". The page developer has to provide the complete path from /OSM for the image and image name. This is specified as, userTable.addToolBarIcon(path+imagename +".gif", function to be called, altvalue);
    ex:
    userTable.addToolBarIcon("/images/core/toolbar_icons/ Test.gif", "toolBarTestFunc","tool altvalue");
14) To hide or show columns from the JSP page, there are 3 sets of methods available for different scenarios.
    a) Scenario 1:
       To hide/show a column based on its index number in the table.properties, call the methods
       hideColumn(columnindex) and
       showColumn(columnindex).
    b) Scenario 2:
       To hide/show a column based on its name in the table.properties, call the methods
       hideColumnByName(columnName) and
       showColumnByName(columnName).
    c) Scenario 3:
       All the methods will hide/show the column in the screen. But these can be made visible or hidden from the Column Chooser or the Settings Window by the User. To hide/show column always such that the user can not change, call the below methods,
       hideColumnByNameAlways(columnName) and
       showColumnByName(columnName).

If the user wants to have the data request filter and sort criteria, the user needs to pass the filter and sort string as parameters to the DHTML Table Constructor. Subsequently, the filtering and sorting is done through a search form in the JSP page component. Specifically, there is a built-in mechanism between the table and the search form for this communication. The JSP page developer (a part of the JSP page component) creates a search form in the JSP component. If the user has to search within a data base, as per look and feel guidelines, the user must select an option entitled "Search Within the Database." Such an action will result in sending a request to the model with the new filter and sort criteria. If no criteria are entered in the search form, no request will be sent.

The format of the initial filter and sort string to be passed to the DHTML Table is as follows:

For filter String, the format is:
1) For a single name value pair, "columnname=value",
2) For multiple name value pairs, "columnname1=value1&columname2=value2"
3) For a range of values for a name value pair, "columname1=value1<value2".
4) For multiple values of a value, "columnname1=value1|value2|value3".

For Sort String, the format is:
1) For a single name value pair, "columnname=ascending" or "columnname=descending",
2) For multiple name value pairs: "columnname1=ascending&columname2=descending38 .

Using such a component, that takes fully advantage of aspects of both Java and HTML, allows tables drawn or otherwise displayed in a browser page, to have all the attributes of the browser page itself. For example, column resizing, reordering, font color/size and a host of other aspects that were previously static, are now dynamic and controllable by a user. This can be seen by the information displayed in the detailed area 104 of the display device 108 of FIG. 1. For example, a table 112 entitled, "Network Connections" displays thirteen (13) records that can be resized or scrolled through or have columns that can be reordered and the like by manipulation of the appropriate icons or controls bordering the table. In summary, using a Java® Script table in accordance with the subject invention results in faster performance (i.e., the download time is significantly less than that of a Java® Applet table) while maintaining functionalities include column dragging, hiding, resizing, scrolling and the like of a Java® Applet table. Additionally, the JavaScript table is considered a "thin" client and is portable across variable devices such as PCs, handheld devices etc. The JavaScript table is further desirable because it does not have the overhead of Java Applet security constraints and need for licensing. The JavaScript table also does not need a plugin; hence, avoiding this overhead in a user's system. Additionally, the Java® Script table bean functions in a uniform manner in multiple browser applications thereby reducing a potential lack of functionality based on specific web browser usage.

Although various embodiments that incorporate the teachings of the present invention have been shown and described in detail herein, those skilled in the art can readily devise many other varied embodiments that still incorporate these teachings.

What is claimed is:

1. Method for displaying user-configurable data in a JavaScript-based table in a web browser application comprising:
   obtaining a copy of a table template;
   creating a file that defines table properties;
   performing a customization subroutine that further comprises:
      instructing a DHTML table component to pass one or more entries of the table properties file;
      setting one or more customizable table properties;
      recognizing a browser application; and
      drawing a browser application page with the customized JavaScript-based table.

2. The method of claim 1 wherein the step of creating a table properties file further comprises selecting a number of columns, type of column and size of column for the customized table.

3. The method of claim 2 further comprising creating a column titles file after creating the table properties file.

4. The method of claim 3 further comprising adding dropdown labels and names to the column titles file.

5. The method of claim 1 wherein the table properties entries that are passed are selected from the group consisting of table property file entries, an XML metamodel name, an XML element name and a default communication flag.

6. The method of claim 1 further comprising reading in a style sheets file after recognizing the browser application.

7. The method of claim 1 further comprising reading in a Java®Script file specific to the browser application.

8. The method of claim 1 wherein the customized JavaScript-based table has dynamic functionality features selected from the group consisting of scrolling browsers, column resizing, column dragging, column hiding, print preview and printing of table data, saving of table data, single selection, multiple selection, user table references, detail view of row data, alternate view for table data, and support of multiple types of data columns such as Boolean, text fields, numeric fields, dropdown lists, icons and hyperlinks.

9. A method for making a user-configurable table generating component for a web-based application comprising:
   creating a Java® file to read a table properties file;
   generating and storing DHTML to the web-based application based on the Java® file;
   generating initial XML; and
   performing a self-customization routine that applies attributes to table columns based on the XML and stores same as objects in the web-based application.

10. The method of claim 9 wherein the self-customization routine further comprises reading the XML; parsing the XML; and assigning attributes to variables to customize the table columns.

11. The method of claim 10 wherein pointers are generated and stored for the customized table columns.

12. The method of claim 9 further comprising reading in and parsing table data and generating rows based on the customized table columns.

13. The method of claim 12 further comprising storing the rows as objects in a component data array.

14. The method of claim 9 wherein the user-configurable table generating component has dynamic functionality features selected from the group consisting of scrolling browsers, column resizing, column dragging, column hiding, print preview and printing of table data, saving of table data, single selection, multiple selection, user table references, detail view of row data, alternate view for table data, and support of multiple types of data columns such as Boolean, text fields, numeric fields, dropdown lists, icons and hyperlinks.

* * * * *